(12) United States Patent
Kekich, Jr. et al.

(10) Patent No.: US 8,585,107 B2
(45) Date of Patent: Nov. 19, 2013

(54) PUSH BUMPER AND MOUNTING SYSTEM

(75) Inventors: Peter Kekich, Jr., Palm Desert, CA (US); Ron Storer, Villa Park, CA (US)

(73) Assignee: IDDEA California, LLC, Brea, CA (US)

( * ) Notice: Subject to any disclaimer, the term of this patent is extended or adjusted under 35 U.S.C. 154(b) by 0 days.

(21) Appl. No.: 13/223,040

(22) Filed: Aug. 31, 2011

(65) Prior Publication Data

US 2013/0049384 A1    Feb. 28, 2013

(51) Int. Cl.
*B60R 19/52* (2006.01)

(52) U.S. Cl.
USPC .................................. 293/115; 293/144

(58) Field of Classification Search
USPC ................ 293/115, 142–144; 180/68.6
See application file for complete search history.

(56) References Cited

U.S. PATENT DOCUMENTS

| | | | |
|---|---|---|---|
| 1,037,122 A | 8/1912 | Buffinger et al. | |
| 1,306,363 A | 6/1919 | Warman | |
| 1,688,950 A | 10/1928 | Wait | |
| 1,911,413 A | 5/1933 | Wait | |
| 2,525,964 A | 10/1950 | Slaback | |
| 2,566,605 A * | 9/1951 | Ekornaas | 49/464 |
| 2,604,348 A * | 7/1952 | Jenkins, Jr. | 293/115 |
| 2,649,308 A | 8/1953 | Bice, Jr. | |
| 2,687,912 A | 8/1954 | Beauchamp | |
| 2,844,864 A | 7/1958 | Schilberg | |
| 2,954,256 A | 8/1960 | Bela Barenyi | |
| 3,431,005 A * | 3/1969 | Priefert | 293/115 |
| 3,470,598 A | 10/1969 | Berthelsen | |
| 3,610,609 A | 10/1971 | Sobel | |
| 3,744,952 A | 7/1973 | Bequet et al. | |
| 4,168,855 A | 9/1979 | Koch | |
| 4,274,648 A | 6/1981 | Robins | |
| 4,753,447 A | 6/1988 | Hall | |
| 4,825,975 A | 5/1989 | Symes | |
| 4,964,256 A | 10/1990 | McCracken | |
| 5,067,760 A | 11/1991 | Moore et al. | |
| 5,139,295 A | 8/1992 | Escobedo | |
| 5,215,343 A | 6/1993 | Fortune | |
| 5,277,465 A | 1/1994 | Weir | |
| 5,683,128 A | 11/1997 | Heyns | |
| 5,695,228 A | 12/1997 | Storer | |
| D396,678 S | 8/1998 | Shklyaver | |
| 6,022,057 A | 2/2000 | Vermeulen | |
| 6,231,093 B1 | 5/2001 | Storer | |
| 6,318,773 B2 * | 11/2001 | Storer | 293/115 |
| 6,612,595 B1 | 9/2003 | Storer | |
| D517,963 S | 3/2006 | Potak | |
| D551,138 S | 9/2007 | Storer et al. | |

* cited by examiner

*Primary Examiner* — Dennis Pedder

(57) ABSTRACT

Provided is a push bumper and mounting system for mounting a push bumper to the bumper of a vehicle. The push bumper and mounting system includes a mounting bracket that is configured to quickly and easily attach to the bumper of the vehicle. The mounting bracket is designed to connect to the front portion of the bumper, without requiring a connection adjacent the rear portion of the bumper. The mounting bracket may only partially circumscribe the bumper, which may facilitate mounting of the bracket onto the bumper because the space between the bumper and the vehicle may be very small.

20 Claims, 3 Drawing Sheets

PUSH BUMPER AND MOUNTING SYSTEM

CROSS-REFERENCE TO RELATED APPLICATIONS

Not Applicable.

STATEMENT RE: FEDERALLY SPONSORED RESEARCH/DEVELOPMENT

Not Applicable.

BACKGROUND OF THE INVENTION

1. Technical Field of the Invention

The present invention relates generally to push bumpers for vehicles, and more specifically to a mounting system for such a device that facilitates installation thereof and also mitigates damage to the bumper of the vehicle to which the push bumper is mounted.

2. Description of the Related Art

Push bumpers are typically mounted on law enforcement vehicles to protect the front of the vehicle while pushing stranded vehicles off the roadway. Such devices are well known and are commonly mounted to the front bumper of such vehicles. The push bumper usually comprises a generally vertical member mounted to the bumper of the vehicle. The vertical member is typically fabricated from a metallic material with the necessary strength to support the resistance of another vehicle during pushing. Typically, the vertical member will have a rubber coating or bumper applied to the surface that contacts the stranded vehicle. Usually, two push bumpers are mounted on either side of the vehicle's front grille in order to properly push a stranded vehicle.

In order to further protect the front of the law enforcement vehicle, the two vertical members can be interconnected by two generally horizontal members disposed in front of the vehicle's grille and configured to form a grille guard. Additionally, the push bumper may comprise two generally horizontal tubular members that wrap around the front ends of the vehicle to form a wrap around brush guard that adds further protection thereto. As will be recognized to those of ordinary skill in the art, the push bumper/grille guard is not limited to just law enforcement vehicles but may be mounted to any vehicle for protection thereof. As such, the push bumper/grille guard may be mounted on off-road vehicles or tow trucks.

The push bumper is essential for proper law enforcement activities. It allows the law enforcement official to use his/her vehicle to push stranded or damaged vehicles during emergency situations. The push bumper ensures that the grille and bumper of the law enforcement vehicle will not be damaged during such maneuvers.

The typical law enforcement vehicle is specially outfitted with police accessories such as emergency lights, police computer, heavy duty engine and suspension. The bumper unit of a typical vehicle is formed from two members and is used for mounting the push bumper thereon. The first member is an outer, purely decorative fascia that integrates the styling of the vehicle to the bumper unit. The second member is an inner metallic bumper disposed within the fascia and attached to the frame of the vehicle. The inner bumper is configured to absorb impacts and therefore has the necessary strength and rigidity to mount the push bumper thereon. The bumper fascia is secured to the front of the vehicle and over the inner bumper via plastic push fasteners.

The conventional push bumper is typically mounted to the inner bumper and bumper fascia of the law enforcement vehicle. As such, mounting and/or access holes must be drilled into the bumper and bumper fascia must be perfectly positioned and aligned. Typically, installation takes about two hours and must be performed by a professional in order to ensure proper installation.

Currently, law enforcement vehicles are replaced quite often due to the wear from constant use. Therefore, after having been used, the law enforcement vehicle is re-sold at auction to the public. However, the conventional mounting of the push bumpers necessitates the replacement of the bumper and bumper fascia when the push bumper is removed prior to re-sale. The mounting holes drilled in the bumper weaken the bumper such that it is not safe for use. Additionally, the holes created in the bumper fascia necessitate replacement thereof because such holes detract from the vehicle's appearance. Therefore, when a law enforcement vehicle is re-sold, typically the vehicle's bumper and bumper fascia are replaced. However, this is not desirable because it adds additional expense to the cost of the used law enforcement vehicle.

In view of the foregoing, there is a need in the art for a push bumper and mounting system configured to connect a push bumper to the vehicle in a manner that does not significantly damage the vehicle's bumper. There is also a need in the art for a push bumper and mounting system that is configured to allow for easy attachment and detachment from the bumper.

BRIEF SUMMARY OF THE INVENTION

The present invention specifically addresses and alleviates the above-identified deficiencies in the art. There is provided a push bumper and mounting system for mounting a push bumper to the bumper of a vehicle. The push bumper and mounting system includes a mounting bracket that is configured to quickly and easily attach to the bumper of the vehicle. Along these lines, the mounting bracket is designed to connect to the front portion of the bumper, without extending over the rear portion of the bumper. In this regard, the mounting bracket may only partially circumscribe the bumper, which may facilitate mounting of the bracket onto the bumper. More specifically, the space between the bumper and the vehicle may be very small, and by attaching the bumper to the front of the vehicle, the user is not required to fit the mounting bracket within the tight space between the bumper and the vehicle. Furthermore, the push bumper preferably includes a grille guard having a cutout formed therein to accommodate the configuration of the grille fascia of the vehicle, which in turn allows the grille guard to be disposed closer to the vehicle.

According to one embodiment, the first mounting bracket includes a first bumper portion, a first mounting tab and a second mounting tab. The first bumper portion is connectable to the bumper and is complimentary to the outer portion of the bumper and configured to only partially circumscribe the bumper when connected thereto. The mounting system further includes a first push bumper member coupled to the first and second mounting tabs. The first push bumper is disposed generally in front of the vehicle when the first mounting bracket is coupled to the bumper to prevent damage to the vehicle.

The bumper may include mounting apertures formed therein during manufacturing of the bumper. The first mounting bracket may include mounting apertures formed therein to facilitate mounting of the first mounting bracket to the bumper. The bracket mounting apertures may be aligned with the bumper mounting apertures and a mechanical fastener may be inserted through the aligned apertures to connect the first mounting bracket to the bumper.

The mounting system may also include a second mounting bracket similar to the first mounting bracket, wherein the second mounting bracket is attachable to the bumper in spaced relation to the first mounting bracket. The mounting system may further include a second push bumper member connectable to the sound mounting bracket.

A grille guard may extend between the first push bumper member and the second push bumper member. The grille guard may include a first grille guard member and a second grille guard member each extending between the first and second push bumper members in spaced relation to each other.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
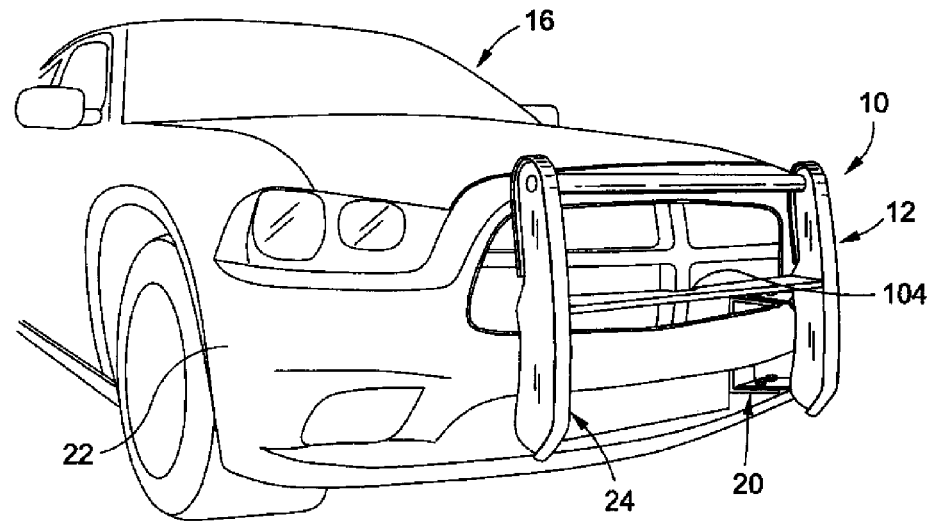
FIG. 1 is a front perspective view of a push bumper and mounting system used to mount a push bumper to the bumper of a vehicle.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating preferred embodiments of the present invention and not for purposes of limiting the same, there is shown a mounting system 10 and push bumper 12, wherein the mounting system 10 is configured to allow the push bumper 12 to be quickly and easily mounted to the vehicle bumper 14 without drilling additional mounting holes within the bumper 14. Along these lines, the push bumper 12 may be mounted to the vehicle 16 via mounting apertures already formed within the bumper 14 during the manufacturing process, and therefore does not mitigate the structural strength of the bumper 14. The mounting system 10 generally includes one or more mounting brackets 18, 20 which may be easily connected to the front portion of the bumper 14 i.e., the portion that faces away from the vehicle 16, which is generally more easily accessible. The mounting brackets 18, 20 do not extend behind the bumper 14 in the generally small space between the bumper and the vehicle 16, which would otherwise make mounting of the brackets 18, 20 more difficult.

Those skilled in the art will appreciate that in past years, Ford's Crown Victoria™ was widely employed by law enforcement agencies to fill their fleet of vehicles. However, law enforcement agencies have recently phased out the usage of Crown Victoria™ vehicles and have transitioned to Dodge Chargers™. Accordingly, several aspects of the push bumper and mounting system 10 are directed toward accommodating the particular sizes and configuration of the 2011 Dodge Charger™. For instance, various aspects of the present invention are directed toward configuring the push bumper 12 to include a cutout that is generally complimentary to the particular grille fascia of the 2011 Dodge Charger™, which allows portions of the push bumper 12 to reside closer to the vehicle, rather than extending outwardly therefrom (See FIG. 1A). Although the following discussion and related drawings focus on the 2011 Dodge Charger™, it is understood that the present invention is not limited thereto, and that the push bumper and mounting system 10 may be adapted for use on other Dodge Charger™ models, and vehicles other than the Dodge Charger™.

Figure 1A:
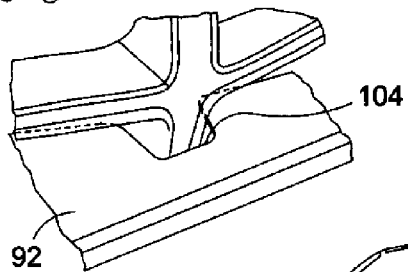
FIG. 1A is a partial upper perspective view of a grille guard having a cutout formed therein to extend around the grille fascia of the vehicle.
Figure 2:
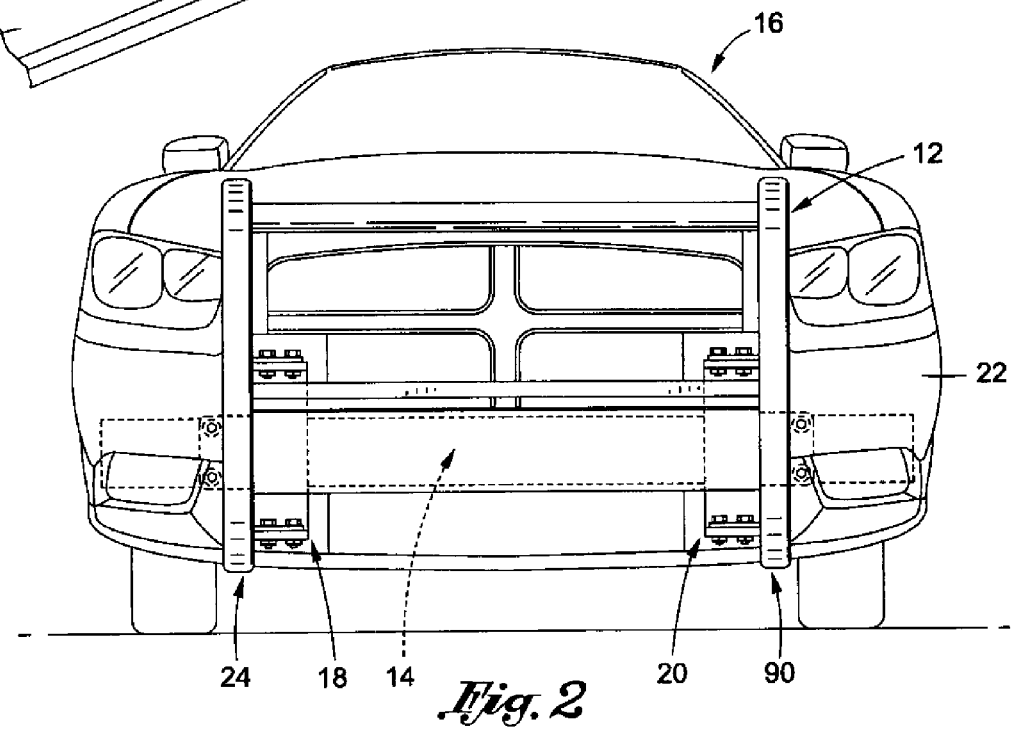
FIG. 2 is a front view of the push bumper and mounting system depicted in FIG. 1.

FIG. 1 is a perspective view of a vehicle 16 having a push bumper 12 mounted to the vehicle bumper 14 via the mounting system 10. FIG. 2 is a front view of the vehicle 16 and mounting system 10, with the bumper 14 shown in dashed lines. The vehicle 16 includes a front fender 22 that covers bumper 14. The mounting system 10 is specifically adapted to extend around the front fender 22 to accommodate the particular size and configuration thereof.

Figure 3:
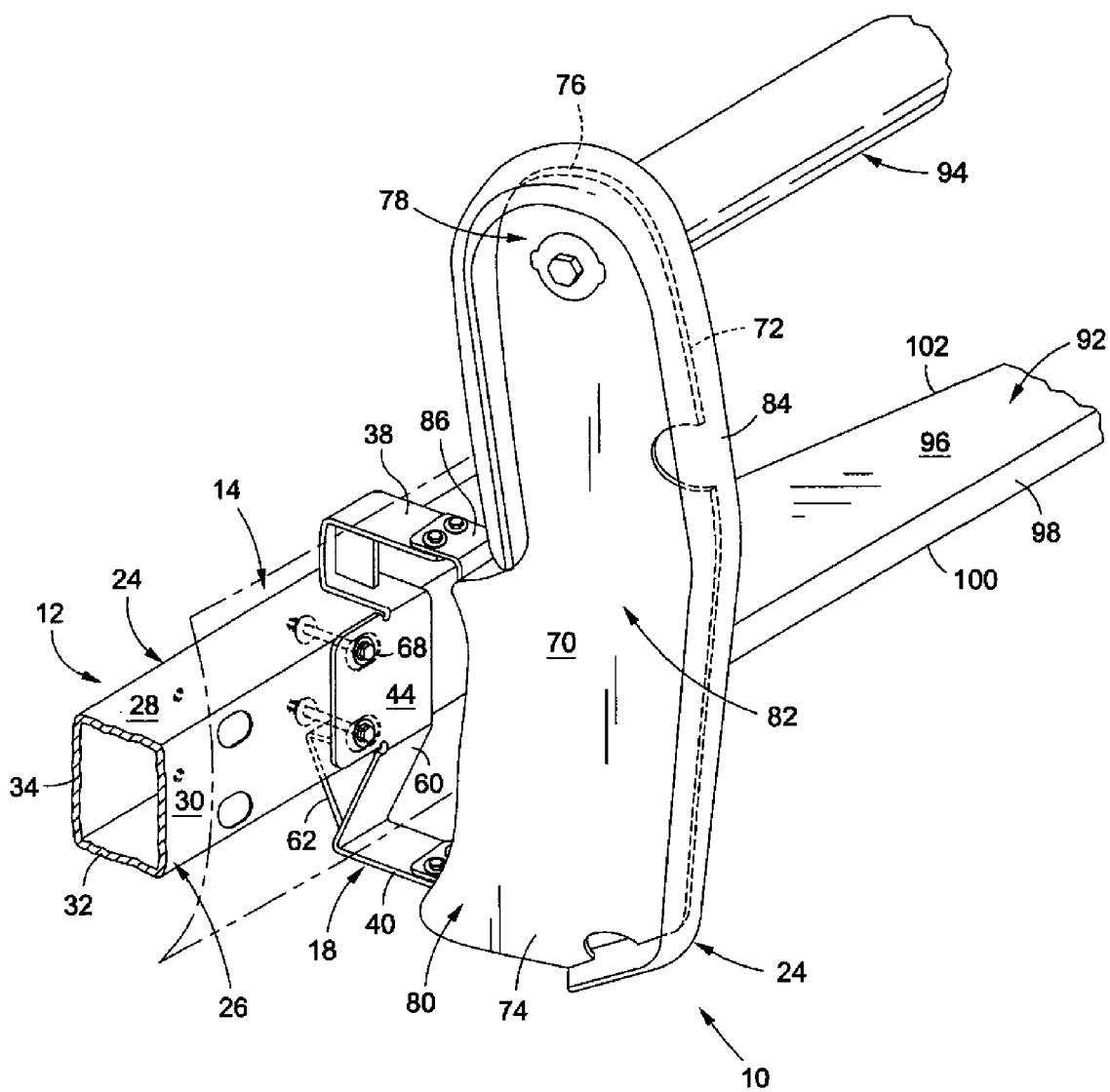
FIG. 3 is a partial upper perspective view of the push bumper and mounting system connected to the bumper.
Figure 4:
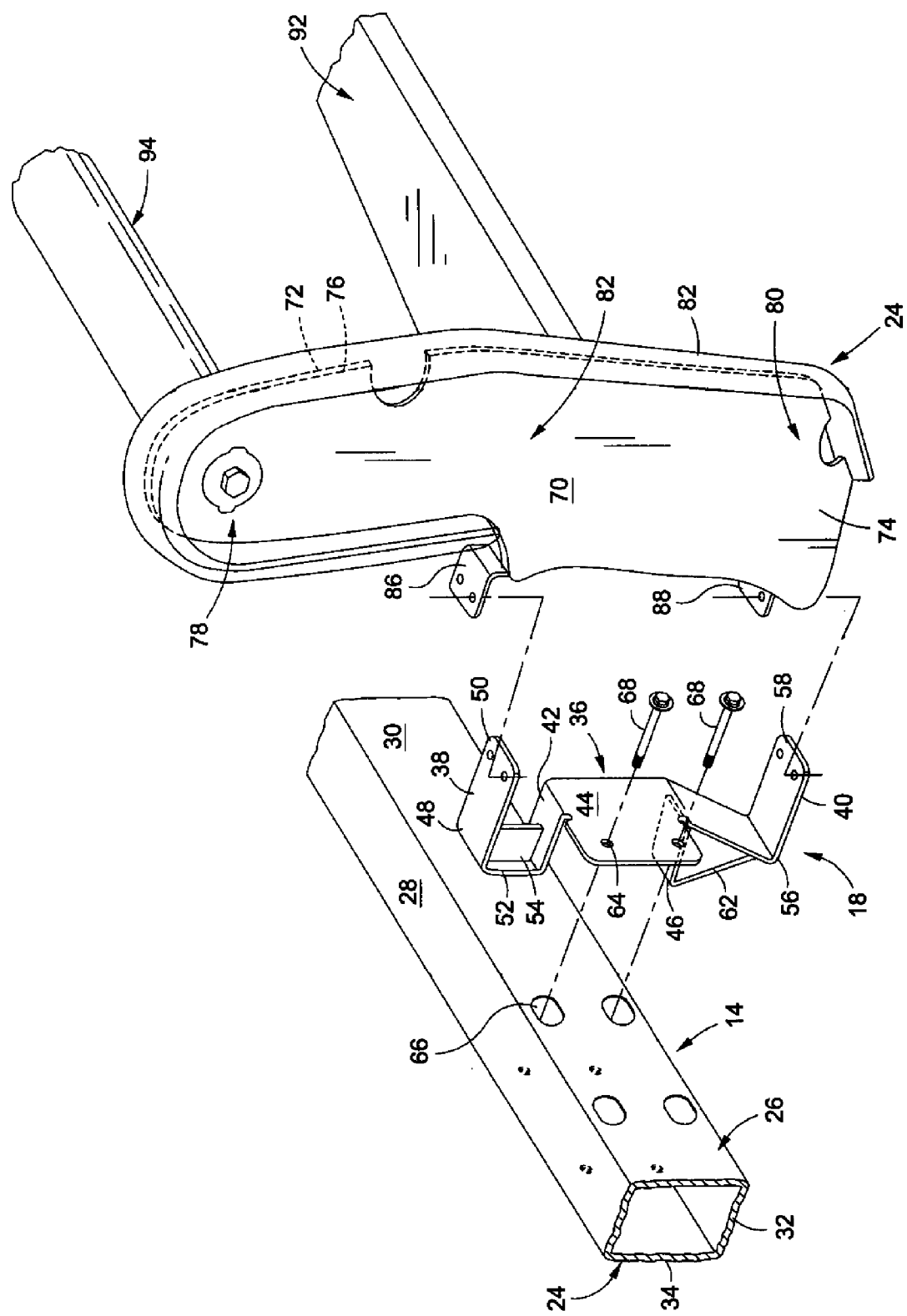
FIG. 4 is an exploded view of the push bumper and mounting system depicted in FIG. 3.

FIG. 3 is a partial upper perspective view of the push bumper and mounting system 10 connected to the bumper 14 of the vehicle 16, while FIG. 4 is an exploded upper perspective view of the push bumper and mounting system shown 10 in FIG. 3. As shown in FIGS. 3 and 4, the push bumper and mounting system 10 includes a first mounting bracket 18 and a first push bumper member 24. The first mounting bracket 18 is connectable to the bumper 14 and the first push bumper member 24 is connectable to the first mounting bracket 18.

The vehicle bumper 14 shown in FIGS. 3 and 4 is elongate and defines a substantially quadrangular cross section in a plane that is substantially orthogonal to the longitudinal axis thereof. The vehicle bumper 14 is substantially hollow and defines an inner portion 24 that faces toward the vehicle 16 and an outer portion 26 that faces away from the vehicle 16. The vehicle bumper 14 also defines a first upper wall 28, second outer wall 30, third lower wall 32 and fourth inner wall 34.

The first mounting bracket 18 includes a first bumper portion 36, a first mounting tab 38 and a second mounting tab 40. The first bumper portion 36 is complimentary to the outer portion 26 of the bumper 14 and includes a top plate 42, a front plate 44 and a bottom plate 46 (See FIG. 4) that are complimentary to the first wall 28, second wall 30 and third wall 32 of the bumper 14. When the first mounting bracket 18 is coupled to the bumper 14, the top plate 42 is disposed adjacent the first wall 28, the front plate 44 is disposed adjacent the second wall 30, and the bottom plate 46 is disposed adjacent the third wall 32.

According to one embodiment, the top plate 42 and bottom plate 46 extend generally orthogonally from the front plate 44 and in spaced relation to each other. The distance between the top plate 42 and the bottom plate 46 is slightly larger than the distance between the first wall 28 and the third wall 32 of the vehicle bumper 14 to allow the bumper 14 to reside between the top plate 42 and the bottom plate 46 when the first mounting bracket 18 is attached to the bumper 14. However, the spacing between the top and bottom plates 42, 46 is such that the top and bottom plates 42, 46 are adjacent to, and preferably in contact with, the first and third walls 28, 32 of the bumper 14 when the first mounting bracket 18 is coupled thereto.

The first mounting tab 38 defines a proximal end portion 48 (See FIG. 4) and a distal end portion 50 (See FIG. 4) and extends generally parallel to the top plate 42. The distal end portion 50 is configured to connect to the first push bumper member 24, while the proximal end portion 48 is coupled to the top plate 42 by a first connecting plate 52 and a second connecting plate 54. The first connecting plate 52 extends between the top plate 42 and the first mounting tab 38, and is disposed in a plane that is substantially perpendicular to the top plate 42 and the first mounting tab 38. The second connecting plate 54 also extends between the top plate 42 and first mounting tab 38, and extends in a plane that is perpendicular to the first connecting plate 52. The second connecting plate 54 is positioned adjacent the first connecting plate 52, and is preferably connected to the first connecting plate 52. The second connecting plate 54 is configured to mitigate bending of the first mounting tab 38 toward the top plate 42 when the first push bumper member 24 is coupled to the first mounting tab 38.

The second mounting tab 40 extends generally parallel to the first mounting tab 38 and the bottom plate 46 and defines a proximal end portion 56 and a distal end portion 58. The distal end portion 58 is configured to connect to the first push bumper member 24, and the proximal end portion 56 is connected to the bottom plate 46 and the front plate 44. A forward support plate 60 extends from the second mounting tab 40 to the front plate 44 while a rearward support 62 plate extends from the second mounting tab 40 to the bottom plate 40. According to one embodiment, the forward support plate 60 and rearward support plate 62 are angularly disposed relative to each other to generally define a "V" shape which intersects adjacent the second mounting tab 40.

In the embodiment depicted in FIGS. 3 and 4, the front plate 44 includes a pair of mounting apertures 64. As described in detail below, the front plate apertures 64 are alignable with mounting apertures 66 already formed within the bumper 14. Therefore, additional holes may not be required for the bumper 14, which may otherwise compromise the structural strength of the bumper 14. Each bumper mounting aperture 66 extends completely through the bumper 14, i.e., completely through the second wall 30 and completely through the fourth wall 34.

Mechanical fasteners 68 may couple the first mounting bracket 18 to the vehicle bumper 14. As shown in the Figures, a threaded bolt is advanced through the front plate mounting aperture 64 and the bumper mounting apertures 66 and is secured by a nut located adjacent the fourth wall 34. In this regard, the first mounting bracket 18 does not completely circumscribe the bumper 14, and only extends along portions for the first face 28, second face 30, and third face 32, which facilitates installation thereof because the bracket 18 is not required to fit in the generally small space between the fourth wall 34 and the vehicle's engine.

The first push bumper member 24 generally includes a main panel 70 having a medial face 72, a lateral face 74 and a peripheral face 76 extending between the medial face 72 and lateral face 74. The main panel 70 also defines a first end portion 78, a second end portion 80, and a medial portion 82 disposed between the first end portion 78 and the second end portion 80. A guard member 84 may be disposed over the peripheral face 76 and may be formed from rubber, plastic, metal or other materials known in the art.

The first push bumper member 24 includes a first connector 86 which is connectable to the first mounting tab 38 of the first mounting bracket 18, and a second connector 88 (See FIG. 4) which is connectable to the second mounting tab 40 of the first mounting bracket 18. The first connector 86 extends from the main panel 70 adjacent the medial portion 82, between the first end portion 78 and the second end portion 80, while the second connector 88 extends from the main panel 70 adjacent the second end portion 80.

The first and second connectors 86, 88 are employed to connect the first push bumper member 24 to the first mounting bracket 18 by engaging with the first mounting tab 38 and second mounting tab 40, respectively, to secure the first push bumper member 24 to the first mounting bracket 18. Along these lines, the first and second connectors 86, 88 may be placed adjacent the first mounting tab 38 and second mounting tab 40 to mount the first push bumper member 24 to the first mounting bracket 18.

Mechanical fasteners may be used to secure the first and second connectors 86, 88 to the first and second mounting tabs 38, 40. According to one embodiment, the first connector 86 includes one or more apertures which may be brought into alignment with one or more apertures formed in the first mounting tab 38 when the first connector 86 is disposed adjacent the first mounting tab 38. Likewise, the second connector 88 includes one or more apertures which may be brought into alignment with one or more apertures formed in the second mounting tab 40 when the second connector 88 is disposed adjacent the second mounting tab 40. Mechanical fasteners, such as screws, bolts, rivets, and the like, may be advanced through the aligned apertures to secure the first push bumper member 24 to the first mounting bracket 18.

The first and second mounting tabs 38, 40 are generally sized and configured to extend around the front fender/fascia 22 of the vehicle 16 toward the first push bumper member 24 when the mounting bracket 18 is mounted to the bumper 14. In this regard, the distance between the first and second mounting tabs 38, 40 may be specifically adapted to accommodate the front fender 22. It is additionally contemplated that the vehicle 16 may include a decorative plate/cover connected to the fender, which may interfere with the first and second mounting tabs 38, 40. In such circumstances, a small opening may be formed within the decorative plate to allow the first and second mounting tabs 38, 40 to extend through the decorative plate/cover. Given that the decorative plate/cover generally provides aesthetic qualities to the vehicle 16 and is not a structural feature, such passages formed within the decorative plate do not mitigate the overall structural integrity of the bumper 14.

Referring now to FIGS. 1 and 2, the vehicle 16 may include a second push bumper member 90 connected to the bumper 14 in spaced relation to the first push bumper member 24. The second push bumper member 90 is similar in structure and function to the first push bumper member 24 described above and shown in FIGS. 1-4. Furthermore, the second push bumper member 90 is mounted to the bumper 14 via a second mounting bracket 20 which is similar in structure and function to the first mounting bracket 18 described above and shown in FIGS. 1-4.

A grille guard extends between the first push bumper member 24 and the second push bumper member 90 over the front of the vehicle 16. The grille guard includes a first grille guard member 92 and a second grille guard member 94 (See FIGS. 3 and 4) disposed in spaced relation to the first grille guard member 92. The first grille guard member 92 shown in the Figures defines a substantially quadrangular cross-section and includes a first upper grille face 96, a second forward grille face 98, a third lower grille face 100, and a fourth inner grille face 102. The first grille guard member 92 also defines a first end portion coupled to the first push bumper member 24 and a second end portion to the second push bumper member 90. In the embodiment shown in FIG. 1, the first grille guard member 92 extends over the grille fascia and includes a cutout 104 (See FIGS. 1 and 1A) to accommodate the structure of the grille fascia. In this regard, the cutout 104 is complimentary to the grille fascia to allow the first grille guard member 92 to accommodate the grille fascia. When the first grille guard member 92 is disposed in front of the vehicle 16, the cutout 104 allows the grille fascia to be inserted therein, which in turn allows portions of the first grille guard member 92 to be disposed closer to the vehicle 16, rather than having to completely extend away from the grille fascia. As such, portions of the first grille guard member 92 extend over the side faces of the grille fascia toward the engine of the vehicle 16.

According to one embodiment, the cutout 104 extends from the fourth inner grille face 102 toward the second forward grille face 98 in one direction, and between the first upper grille face 96 and the third lower grille face 100 in another direction. The cutout 104 may be formed within the first grille guard member 92 during manufacturing of the first grille guard.

The second grille guard member 94 shown in the Figures is substantially cylindrical. The first and second push bumper members 24, 90 include apertures formed within the main panels 70 thereof, with the apertures being complimentary in cross-sectional size and shape to the second grille guard member 94. Along these lines, the second grille guard member 94 may be advanced through the apertures to connect the second grille guard member 94 to the first and second push bumper members 24, 90. One or more mechanical fasteners may be used to secure the second grille guard member 94 to the first and second push bumpers 24, 90 when the second grille guard member 94 is disposed within the apertures. In this regard, the second grille guard member may be removably secured to the first and second push bumper members 24, 90, which would allow a user to remove the second grille guard member 94 and replace the second grille guard member 94 with a new second grille guard member 94 in the event of damage thereto.

The size and shape of the first and second grille guard members 92, 94 shown in the Figures and described herein are exemplary in nature only, and those skilled in the art will recognize that grille guard members 92, 94 that vary in size and shape may also be used without departing from the spirit and scope of the present invention. Furthermore, although the second grille guard member 94 is described as being detachable from the first and second push bumper members 24, 90, it is contemplated that various embodiments include a second push bumper member 90 that is more permanently secured to the first and second push bumper members 24, 90. Various embodiments may also include a first grille guard member 92 which is detachable from the first and second push bumper members 24, 90, or more permanently secured thereto.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A push bumper and mounting system for use on a vehicle having a grille fascia and a bumper connected to the vehicle to define an inner portion facing toward the vehicle and an outer portion facing away from the vehicle, the push bumper and mounting system comprising:
  a first mounting bracket comprised of a one-piece body having a first bumper portion configured to be connectable to the bumper and complimentary to the outer portion of the bumper and configured to only partially circumscribe the bumper when connected thereto;
  a second mounting bracket comprised of a one-piece body having a second bumper portion configured to be connectable to the bumper and complimentary to the outer portion of the bumper and configured to only partially circumscribe the bumper when connected thereto; and
  a push bumper connected to the first and second mounting brackets and comprising:
    a first push bumper member coupled to the first mounting bracket, the first push bumper being disposed generally in front of the vehicle when the first mounting bracket is coupled to the bumper;
    a second push bumper member coupled to the second mounting bracket, the second push bumper being disposed generally in front of the vehicle when the second mounting bracket is coupled to the bumper; and
    an elongate grille guard connected to the first and second push bumper members adjacent opposed ends of the grille guard, the grille guard having:
      an inner face configured to face toward the vehicle; and
      an opposing outer face configured to face away from the vehicle;
    the inner face extending toward the outer face at an intermediate portion of the grille guard to define a cutout at an approximate midpoint of the grille guard and configured to allow the grille guard to be at least partially extendable about the grille fascia;
    the grille guard defining a depth as the distance between the outer face and inner face along an axis that is perpendicular to the outer face, the depth being variable along the grille guard, the minimum depth being located at the cutout, the grille guard being configured such that the depth does not decrease between the cutout and the opposed ends of the grille guard;
  the first and second mounting brackets being configured to support the entire weight of the push bumper when the first and second mounting brackets are connected to the bumper.

2. The push bumper and mounting system as recited in claim 1, wherein the grille guard is complimentary in shape to a portion of the grille fascia.

3. The push bumper and mounting system as recited in claim 1, wherein the grille guard defines a substantially quadrangular cross section and includes a first grille face an opposing third grille face, a second grille face and an opposing fourth grille face, the cutout extending into the grille guard from the fourth grille face toward the second grill face and between the first and third grille faces.

4. The push bumper and mounting system as recited in claim 1, wherein the first bumper portion includes a front plate, a top plate and a bottom plate, the top plate and bottom plate extending from the front plate in a direction substantially orthogonal to the front plate, the top and bottom plates being disposed in spaced relation to each other.

5. The push bumper and mounting system as recited in claim 4, wherein the front plate is substantially planar.

6. The push bumper mounting system as recited in claim 1, further comprising a fastener for connecting the first mounting bracket to the bumper.

7. The push bumper mounting system as recited in claim 6, wherein the first bumper portion includes a mounting aperture extending therethrough, the mounting aperture being alignable with a bumper aperture formed within the bumper, the fastener being advanceable through the mounting aperture and the bumper aperture to connect the first mounting bracket to the bumper.

8. The push bumper mounting system as recited in claim 1, further comprising a second grille guard member attached to the first and second push bumper members in spaced relation to the first grille guard member.

9. A push bumper for use on a vehicle having a grille fascia and a bumper connected to the vehicle to define an inner portion facing toward the vehicle and an outer portion facing away from the vehicle, the push bumper and mounting system comprising:
   a first push bumper member configured to be connectable to the bumper;
   a second push bumper member configured to be connectable to the bumper in spaced relation to the first push bumper member; and
   a grille guard connected to the first and second push bumper members, the grille guard having:
      an inner end configured to face toward the vehicle;
      an opposing outer end configured to face away from the vehicle; and
      a cutout formed within the grille guard at an approximate midpoint thereof and extending from the inner end toward the outer end, the cutout being configured to allow the grille guard to be at least partially extendable about the grille fascia;
      the grille guard defining a depth in a direction from the inner end to the outer end, the grille guard defining a minimum depth at the cutout.

10. The push bumper and mounting system as recited in claim 9, wherein the grille guard is complimentary in shape to a portion of the grille fascia.

11. The push bumper and mounting system as recited in claim 9, wherein the grille guard defines a substantially quadrangular cross section and includes a first grille face an opposing third grille face, a second grille face and an opposing fourth grille face, the cutout extending into the grille guard from the fourth grille face toward the second grill face and between the first and third grille faces.

12. The push bumper mounting system as recited in claim 9, further comprising a second grille guard member attached to the first and second push bumper member in spaced relation to the first grille guard member.

13. A mounting device for use with a push bumper member and a vehicle having a bumper connected to the vehicle, the bumper defining an inner portion facing toward the vehicle and an outer portion facing away from the vehicle, the mounting device comprising:
   a first mounting one-piece bracket having:
      a first mounting tab;
      a second mounting tab, the first and second mounting tabs being engageable with the push bumper member; and
      a front plate coupled to the first and second mounting tabs and extendable over a portion of the bumper;
   the first mounting bracket being connectable to the bumper and complimentary to the outer portion of the bumper and configured to only partially circumscribe the bumper when connected thereto;
   the first and second mounting tabs extending in front of the bumper when the mounting bracket is connected to the bumper.

14. The push bumper and mounting system as recited in claim 13, wherein the first mounting bracket includes a first bumper portion coupled to the first and second mounting tabs, the first bumper portion including:
   a top plate, and
   a bottom plate,
   the top plate and bottom plates extending from the front plate in a direction substantially orthogonal to the front plate, the top and bottom plates being disposed in spaced relation to each other.

15. The mounting device recited in claim 13, further comprising a second mounting bracket connectable to the bumper in spaced relation to the first mounting bracket, the second mounting bracket being complimentary to the outer portion of the bumper and configured to only partially circumscribe the bumper when connected thereto, the second mounting bracket being engageable with the push bumper member.

16. The mounting device recited in claim 13, wherein the first mounting bracket is configured to connect to the bumper such that the first mounting bracket extends over the outer portion of the bumper and the inner portion of the bumper remains uncovered by the first mounting bracket.

17. The mounting device recited in claim 13, wherein the first mounting bracket includes a mounting aperture for mounting the first mounting bracket to the bumper.

18. A push bumper and mounting system for use on a vehicle having a grille fascia and a bumper connected to the vehicle to define an inner portion facing toward the vehicle and an outer portion facing away from the vehicle, the push bumper and mounting system comprising:
   a first mounting bracket comprised of a one-piece body having:
      a first mounting tab;
      a second mounting tab; and
      a first bumper portion configured to be connectable to the bumper and complimentary to the outer portion of the bumper and configured to only partially circumscribe the bumper when connected thereto;
   a second mounting bracket comprised of a one-piece body having a second bumper portion configured to be connectable to the bumper and complimentary to the outer portion of the bumper and configured to only partially circumscribe the bumper when connected thereto;
   a push bumper connected to the first and second mounting brackets comprising:
      a first push bumper member coupled to the first and second mounting tabs, the first push bumper being disposed generally in front of the vehicle when the first mounting bracket is coupled to the bumper;
      a second push bumper member coupled to the second mounting bracket, the second push bumper being disposed generally in front of the vehicle when the second mounting bracket is coupled to the bumper; and
      an elongate grille guard connected to the first and second push bumper members adjacent opposed ends of the grille guard, the grille guard having a cutout formed therein at an approximate midpoint thereof, the cutout being configured to allow the grille guard to be at least partially extendable about the grille fascia, the grille guard defining a variable depth, the minimum depth being located at the cutout;
   the first and second mounting brackets being configured to support the entire weight of the push bumper when the first and second mounting brackets are connected to the bumper.

19. The push bumper mounting system as recited in claim 18, wherein the first mounting bracket is configured such that the first mounting tab extends in a plane spaced from the bumper when the mounting bracket is coupled to the bumper.

20. The push bumper mounting system as recited in claim 19, wherein the first mounting bracket is configured such that the second mounting tab extends in a plane spaced from the bumper when the mounting bracket is coupled to the bumper.

* * * * *